REFUSE GATHERING MACHINE

Original Filed April 22, 1966 3 Sheets-Sheet 1

INVENTOR.
HERBERT O. VINYARD,

BY
Hoffgren, Wagner, Allen, Stellman & McCord

ATTORNEYS.

REFUSE GATHERING MACHINE

Original Filed April 22, 1966 3 Sheets-Sheet 2

INVENTOR.
HERBERT O. VINYARD,
BY
Hofgren, Wegner, Allen, Stellman & McCord
ATTORNEYS.

REFUSE GATHERING MACHINE

Original Filed April 22, 1966 3 Sheets-Sheet 3

INVENTOR.
HERBERT O. VINYARD,
BY
ATTORNEYS.

United States Patent Office

Re. 27,169
Reissued Sept. 20, 1971

27,169
REFUSE GATHERING MACHINE

Herbert O. Vinyard, Rte. 2, Box 75H,
Hammond, La. 70401

Original No. 3,348,652, dated Oct. 24, 1967, Ser. No. 544,600, Apr. 22, 1966. Application for reissue Oct. 8, 1969, Ser. No. 870,517
Int. Cl. B65g *31/04, 65/06*
U.S. Cl. 198—7 18 Claims

Matter enclosed in heavy brackets [ ] appears in the original patent but forms no part of this reissue specification; matter printed in italics indicates the additions made by reissue.

ABSTRACT OF THE DISCLOSURE

A refuse gathering machine comprising an open bottom horizontal housing, an upwardly directed inclined chute leading from said housing and communicating with a central portion of the interior thereof, the upper and lower walls of said chute penetrating within said housing in curved lower portions while the sidewalls of the chute terminate at the housing without entrance, a conveyor shaft extending the length of the housing and having oppositely turned conveyor screw portions at its ends and a thrower rotor at its center including a pair of blades lying in planes parallel to the shaft and having outer free edges which pass said curved lower portions of the chute walls with wiping tolerance, said conveyor screw portions serving to move refuse toward the center of the shaft when it is rotated and said thrower rotor serving to throw material upwardly through the chute to a receiver.

This invention relates to mobile machines for picking up refuse, such as manure, regardless of its moisture content, from the ground or other surfaces, such as barn floors, so as to clean such surfaces and to deposit the picked up material into a receiver; and more particularly to vehicle-mounted machines of this kind which are powered from the power take-off shaft of a tractor pulling a receiver vehicle upon which the machine is mounted, the tractor's hydraulically operated drawbar being utilized to lower the machine to ground level and to elevate the machine to a non-pickup level.

The primary object of the invention is the provision of efficient and adaptable machines of the kind indicated, which are mechanically reliable, and are simple and inexpensive in construction, being composed of a relatively small number of uncomplex and easily assembled parts; and which require the attention and services of but one man for a complete refuse gathering operation.

Another object of the invention is the provision of machines of the character indicated above, which are capable of being mounted on a variety of receiver vehicles, including a manure spreader, with which the within described and illustrated machines are shown associated.

Referring in detail to the drawings, and first to FIG-

URES 1 to 3, the illustrated machine 10 is shown supported from the bed 12 of a mobile manure spreader 14, with its tail gate open or out of the way, by means of a pair of horizontal angle iron support beams 16, fixed, as indicated at 18, upon the bed 12 and extending forwardly therefrom.

Figure 2:
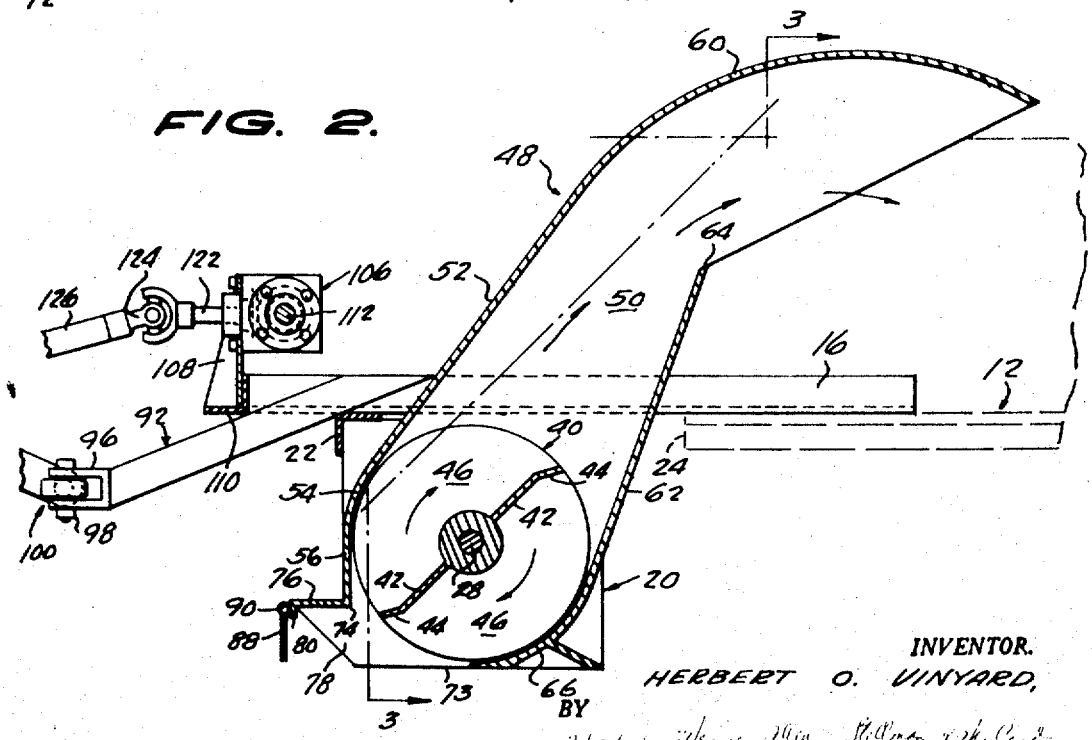
FIGURE 2 is a fragmentary vertical longitudinal section, taken on the line 2—2 of FIGURE 1.

The machine 10 comprises a horizontal, transversely elongated housing 20, of rectangular form, along whose upper forward corner is fixed an angle iron 22 which is fixed to the undersides of the beams 16, the housing 20 thereby being supported in front of and spaced from the forward end 24 of the spreader bed 12, as shown in FIGURE 2.

The housing 20 has vertical end plates 26, through which are centrally journalled, related end portions of a rotary conveyor shaft 28. The shaft has a bearing collar 30, on one end thereof, here shown as being its right-hand end, and has fixed on its other end a sprocket wheel 32, with a bearing washer 34 intervening between the sprocket wheel and the adjacent end plate 26. The shaft 28 is formed with left- and right-hand conveyor screw portions 36 and 38, respectively, extending rearwardly from the end plates 26 for equal distances, as far as the related sides of a central material thrower rotor 40.

The thrower rotor 40 comprises a pair of diametrically opposed, flat radial blades 42, having oppositely angled free edge portions 44, which extend in the direction of rotation of the rotor. Semicircular bracing plates 46, concentric with the shaft 28, and opposed to each other, are suitably fixed to the side edges of the thrower blades 42, which serve also to confine, in the area of these blades, material brought thereto by the conveyor screw portions 36, 38, as the shaft 28 is rotated.

An upstanding, rearwardly and upwardly angled chute 48, reaches above and rearwardly relative to the housing 20 and over the spreader bed 12. The chute 48 is of rectangular horizontal cross section, and has side walls 50 which are fixed to and extend between the support beams 16. The chute is upwardly tapered, from front to rear, and has a front wall 52 which is substantially straight and flat and is angled upwardly and rearwardly, at an acute angle to the perpendicular. At its lower end, the front wall 52 curvedly merges, as indicated at 54, into a short perpendicular portion 56, which is a part of the front wall 58 of the housing 20, the curved portion 54 being concentric with and close to the periphery of the thrower rotor 40. The front chute wall 52 merges, at its upper end, into a rearwardly and downwardly lowered top wall 60, which serves to deflect down upon the spreader bed 12, material thrown up through the chute by the thrower rotor 40.

The chute 48 has a straight, flat upwardly and rearwardly angled rear wall 62, substantially shorter than the front wall 52, which terminates, at its upper end, in a straight edge 64 which is located beneath and is spaced downwardly from the forward end of the bowed top wall 60, of the chute. At its lower end, the rear wall 62 merges into a concavely curved lower end portion 66, which is located close to and is concentric with the periphery of the thrower rotor 40, and extends thereunder, the rear wall 62 being a part of the rear wall 68 of the housing 20.

The housing 20 has an open bottom, as indicated at 70, and its end plates 26 have, at their lower ends, and extending laterally outwardly therefrom, fixed protective shoes 72, and the lower edges 73 of the end plates 26 are straight and horizontal for close contact with the surface from which material is to be gathered. The housing front wall 52, as shown in FIGURE 2, has a lower edge 74, which is spaced upwardly from the lower edges of the end plates 26, from which edge a fixed narrow, horizontal wall 76 extends forwardly, which is braced by triangular extensions 78 of the end plates. A narrow vertical pendant flange 80 is on the forward edge of the wall 76.

Secured along the flange 80, as indicated at 82, for ps 84, having lower edges 86 only slightly elevated *nt of the discharge opening is substantially less than the* ove the lower edges 73 of the housing end plates 26. iking up the space between the flexible flaps 84 is a rigid etal hinged plate 88, which, at its upper edge, is hinged, indicated at 90, to the flange 80, so as to be capable being swung rearwardly, to pass material on the ground the thrower rotor 40, but prevented from swinging rwardly beyond its normal perpendicular position and eing material to move forwardly from the region of e rotor 40.

A forwardly and downwardly angled, centered drawbar is fixed upon and extends forwardly from the top wall , of the housing 20, and terminates in a clevis 96, adapt- to be pivotally secured, as by means of a bolt 98, to a draulically controlled, vertical movable drawbar 100, tending rearwardly from a tractor 102. This arrange- ent is such that by operating the tractor drawbar 100, e housing 20 and the spreader are adapted to be angled wnwardly, from their normal horizontal positions, to pressed positions, wherein the lower edges 73 of the achine housing end plates 26 run to the ground, for a aterial gathering operation.

A drive assembly 104, for the shaft 28, comprises a eed-reducing gear assembly 106 mounted to a bracket 8 upstanding on a cross member 110, extending between e housing support beams 16, at their forward ends, a rizontal drive shaft 112 extending from the left-hand le of the gear assembly and journalled through a bearing 4 on an upstanding bracket 116, on the adjacent end of e housing 20. The drive shaft 112 carries a sprocket heel 118, smaller than the sprocket wheel 32, and a rocket chain 120 is trained over both sprocket wheels. A driven stub shaft 122 extends forwardly from the ar assembly 106 and is universally connected, as indi- ted at 124, to the rear end of the power take-off shaft 6, of the tractor 102.

In operation, the housing 20 having been lowered to ground and the power take-off shaft being in rotation, e machine conveyor shaft 28 is rotated, with the trac- 102 and the spreader 14 moving forwardly, material the ground will push the flaps 84 and the hinged plate rearwardly and allow the material to come into con- t with the conveyor screw portions 36, 38, and the ower rotor 40. The screw portions 36, 38 then move material to the thrower rotor, from the opposite sides reof, and the thrower blades 42 throw the material up ough the chute 48, from which it falls onto the bed 12 the spreader, in a continuous cycle.

Figure 1:
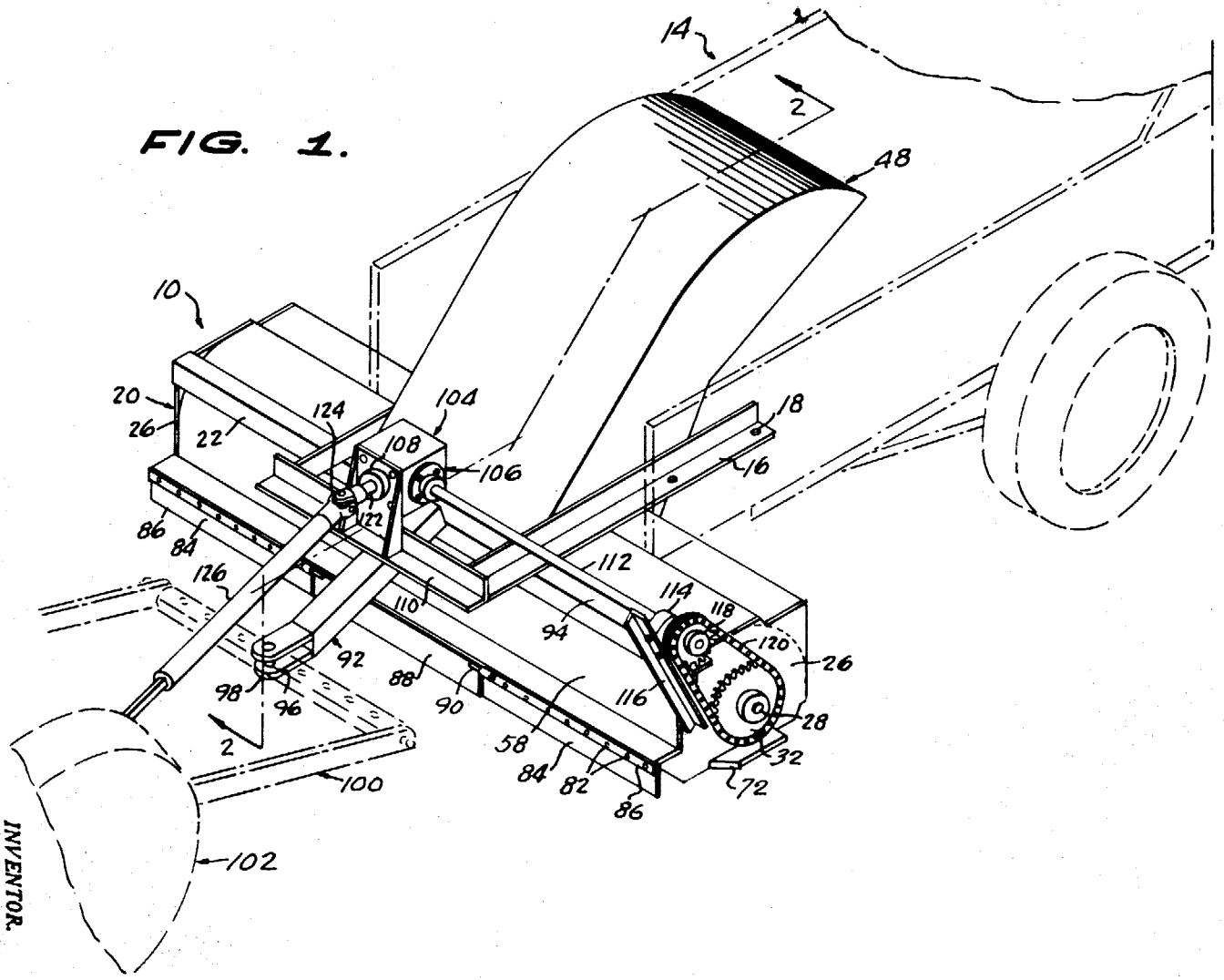
FIGURE 1 is a fragmentary schematic view, partly in phantom lines, showing a machine of the present invention installed on a manure spreader drawn by a tractor, the machine being driven from the power take-off shaft of the tractor.
Figure 3:
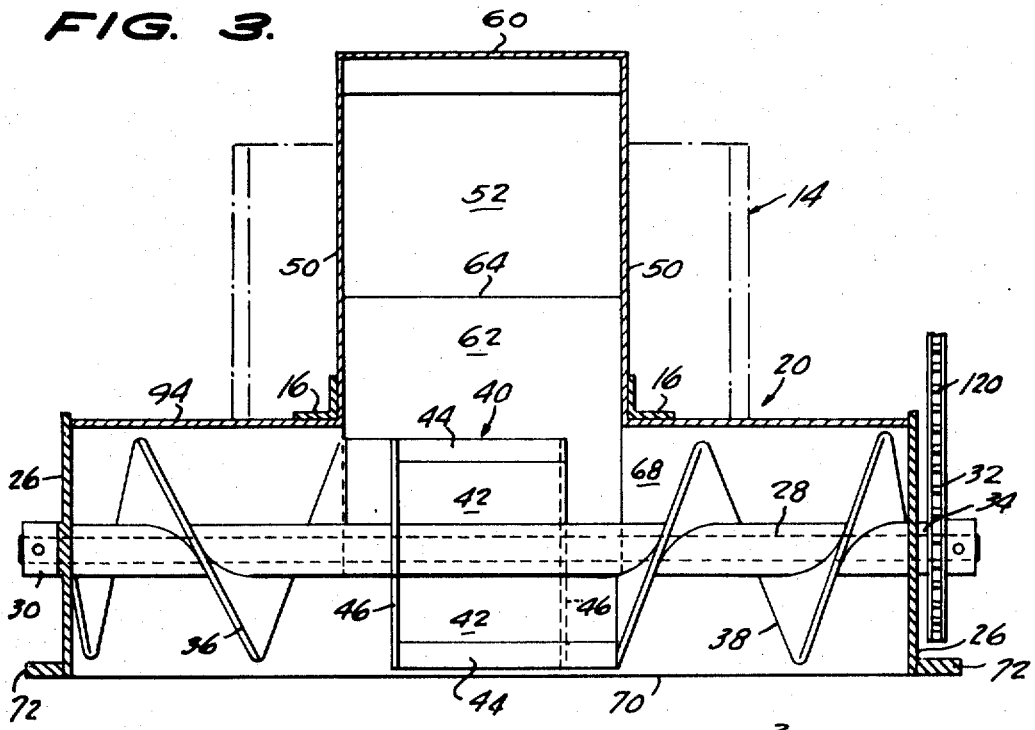
FIGURE 3 is a vertical transverse section, taken on the line 3—3 of FIGURE 2.
Figure 4:
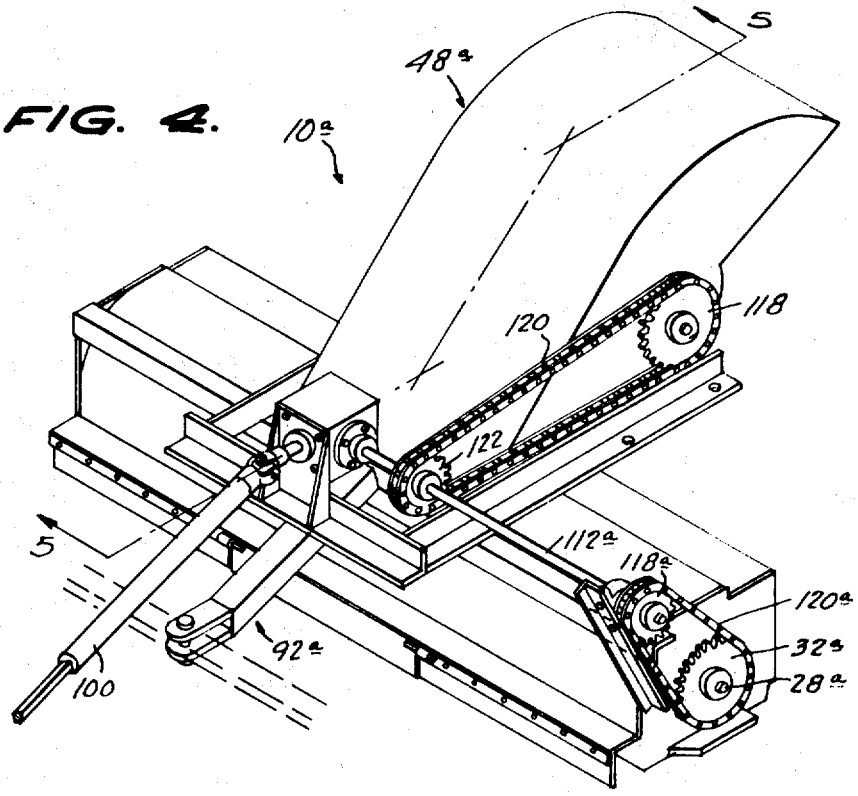
FIGURE 4 is a perspective view of another form of machine of the present invention; and, FIGURE 5 is a vertical section, taken on the line 5—5 of FIGURE 4.
Figure 5:
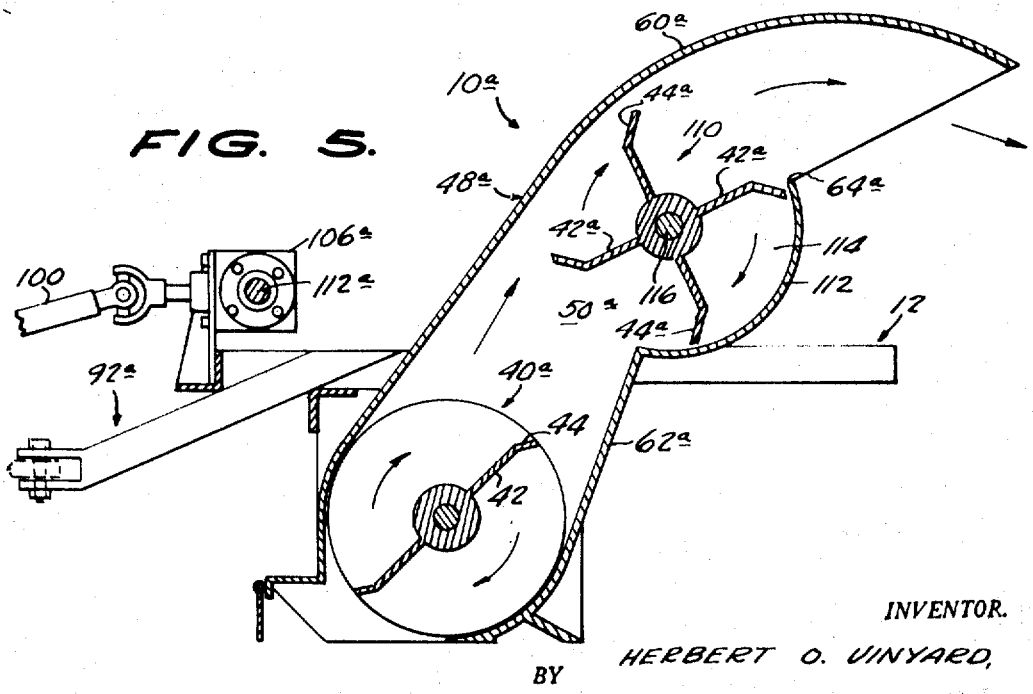

In FIGURES 4 and 5 is shown another form of machine a which is similar to that described hereinabove and own in FIGURES 1 to 3 of the drawings, except for the dition of a second or upper thrower rotor 110, located thin the upper part of the chute 48a, and modification the chute to accommodate this rotor. Parts shown in GURES 4 and 5 common to FIGURES 1 to 3, are given same designating numerals, plus a.

In the machine 10a, the rear wall 62a, of the chute 48a, tead of being straight, has a concave-convex upper por- n 112, which terminates in an upper edge 64a spaced wnwardly from the top wall 60a of the chute; and the ite side walls 50a are extended rearwardly to con- mably join the side edges of the upper portion 112, as licated at 114.

A transverse rotor shaft 116 is suitably journalled ough the chute side walls, at the center of curvature of arcuate rear wall portion 112, on which is fixed an per thrower rotor 110. The rotor 110 is different from lower thrower rotor of FIGURES 1 to 3, in that the or 110 has four equally circumferentially spaced flat lial blades 42a, having edge portions 44a angled in the ection of rotation of the rotor 110; and the rotor 110 devoid of bracing plates.

The end of the rotor shaft 116, adjacent to the drive shaft 112a, has a sprocket wheel 118 fixed thereon, over which is trained a sprocket chain 120, which is trained over a sprocket wheel 122, fixed on the shaft 112a, the sprocket wheel 118 being slightly larger in diameter than the sprocket wheel 122.

In operation, the presence of the second or upper thrower rotor 110 accelerates the discharge of pick-up material from the chute 48a, by engaging the material as it reaches the second rotor and throwing it onto the receiving vehicle with greater speed and volume, thereby increasing the overall capacity of the machine, without requiring acceleration of the speed of operation of the lower rotor 40a.

What is claimed is:

1. A refuse gathering machine comprising an elongated, open bottom, horizontal housing having a top wall, a rear wall, a front wall, and end plates, an upwardly directed inclined chute leading from the interior of the central portion of said housing, said chute having a discharge opening spaced considerably above and offset from the vertical plane containing the housing axis, the upper and lower walls of said chute penetrating within said housing in curved lower portions, the sidewalls of the chute terminating at the housing without substantial entrance to permit the free movement of refuse from the ends of the housing to its center, a conveyor shaft extending longitudinally within the housing, oppositely turned conveyor screw portions on said shaft extending from the end plates to the shaft center portion lying within said chute, a thrower rotor fixed on said shaft center portion and including a pair of blades lying in planes parallel to the shaft axis, said blades having outer free edges which pass said curved lower portions of the upper and lower chute walls with wiping tolerance when the rotor is turned, and means for rotating the shaft in a direction to cause the conveyor screw portions to move refuse entering the housing through its open bottom to the thrower rotor, the thrower rotor then serving to throw refuse upwardly through the chute for emptying through said discharge opening onto a receiver.

2. A refuse gathering machine according to claim 1 wherein said chute is tapered to provide smaller cross-sections successively upwardly, whereby to return refuse material not reaching said discharge opening to said thrower rotor to be again thrown upwardly.

3. A refuse gathering machine according to claim 1 wherein a pair of substantially horizontally disposed supporting bars are each secured at one end to said housing, the other ends of said bars being adapted to seat on a receiver vehicle for supporting the housing and chute directly without need for ground engaging wheels and the like.

4. A refuse gathering machine according to claim 1, wherein the front wall of the housing has a lower edge spaced upwardly from the lower edges of the end plates of the housing and affording entrance into the housing of refuse material on the ground, a horizontal wall on and extending forwardly from the lower edge of said front wall, flexible flaps extending the lengths of the conveyor screw portions and securably depending from said horizontal wall, and a rigid plate extending the length of the thrower rotor between said flaps, and extending downwardly from said horizontal wall in line with said flaps, means hinging the rigid plate to said horizontal wall to swing rearwardly into the housing, and stop means preventing the rigid plate from swinging forwardly beyond a normal perpendicular position.

5. A refuse gathering machine according to claim 1, wherein said thrower rotor blades are diametrically opposed flat blades, said blades having free edge portions angled in the direction of rotation of the rotor.

6. A refuse gathering machine according to claim 1, wherein said thrower rotor blades are diametrically opposed flat blades, said blades having free edge portions angled in the direction of rotation of the rotor, said blades having side edges, and opposed semicircular side plates severally fixed to related portions of said side edges of the blades.

7. A refuse gathering machine according to claim 1, wherein a second and similar thrower rotor is located within the upper part of the chute spaced considerably above said first thrower rotor, and means is provided operatively connecting said shaft with the second thrower rotor to drive the same.

8. A refuse gathering machine according to claim 7, wherein said second thrower rotor has four equally circumferentially spaced radial blades, said blades having edge portions angled relative to the blades in the direction of rotation of the upper rotor.

*9. A machine adapted to be moved forwardly for gathering refuse and discharging it into a wheeled receptacle said machine comprising, in combination:*

*a transversely elongated accumulator housing which has upright end plates the lower margins of which are at the bottom of the housing, and a transverse housing wall including front, upper, rear and lower portions, the lower margin of said front portion cooperating with the front margins of said end plates to define a refuse receiving opening, and said lower portion being behind said refuse receiving opening and having a bottom margin at the bottom of the housing so that forward movement of the machine causes refuse to accumulate in the housing, and there being a discharge opening in the upper portion of said wall which has a front transverse margin adjacent the front portion of the housing wall, a rear transverse margin adjacent the rear portion of the housing wall, and lateral margins connecting said front and rear margins;*

*a shaft within said housing parallel to the housing wall, said shaft having a portion beneath the discharge opening;*

*a thrower rotor on said portion of the shaft, said rotor being rotatable in a direction to mechanically impel accumulated refuse upwardly through the discharge opening adjacent a selected transverse margin thereof;*

*a short open bottomed discharge chute the axis of which extends upwardly, said chute having a transverse front chute wall extending upwardly from the front margin of the discharge opening, a transverse rear chute wall extending upwardly from the rear margin of the discharge opening, lateral chute walls extending upwardly from the lateral margins of the discharge opening and an upper opening at the top of one of said chute walls through which refuse may pass at an angle to the axis of the chute into a receptacle, the one of said transverse chute walls which extends upwardly from the selected transverse margin of the discharge opening being oriented to guide impelled refuse upwardly in the chute, and there being means at the upper end of the discharge chute for changing the direction of movement of the impelled refuse to direct it toward the upper opening;*

*drive means for rotating said rotor;*

*and means for selectively connecting said drive means to a power source.*

*10. The machine of claim 9 in which the transverse extent of the discharge opening is substantially less than the length of the accumulator housing, in which there is conveyor means on the shaft alongside the thrower rotor which is rotatable in a direction to move refuse laterally into the thrower rotor, and in which the drive means rotates the conveyor means.*

*11. The machine of claim 10 in which the discharge opening is positioned a substantial distance from each end plate of the housing, and in which the conveyor means on the shaft includes portions at opposite sides of the thrower rotor.*

*12. The machine of claim 11 in which the conveyor portions at opposite sides of the thrower rotor are constructed to move refuse into areas of the rotor which are substantially 180° apart, and in which there are refuse baffles flanking the rotor, each of said baffles being positioned to stop material moving toward it from the opposite side of the rotor.*

*13. The machine of claim 10 in which the thrower rotor comprises a plurality of blades which project equal distances radially from the shaft, and in which the conveyor means on the shaft defines a cylinder of rotation of radius substantially equal to the radius of the blades.*

*14. The machine of claim 9 in which the means at the upper end of the discharge chute comprises an effectively arcuate top wall which merges into said one of said transverse walls and which has a free edge defining the upper margin of the upper opening.*

*15. The machine of claim 14 in which said one of said transverse chute walls is the front wall, and in which the upper opening is at the top of the rear transverse chute wall.*

*16. The machine of claim 14 in which the means at the upper end of the discharge chute includes an additional thrower rotor which in operation describes a cylinder of revolution the upper portion of which overlaps the upper opening.*

*17. The machine of claim 9 which includes a forwardly extending flange at the lower margin of the front portion of the housing wall, a rigid plate pivotally suspended from the front edge of said flange in front of the thrower rotor the height of said plate being no more than the front-to-rear dimension of the flange, and stop means for preventing said plate from swinging forwardly past a vertical position.*

*18. The machine of claim 17 in which the transverse extent of the discharge opening is substantially less than the length of the accumulator housing, in which there is conveyor means on the shaft alongside the thrower rotor for moving refuse laterally into the thrower rotor, and in which flexible flap means depends from the front edge of the flange in front of the conveyor means.*

References Cited

The following references, cited by the Examiner, are of record in the patented file of this patent or the original patent.

UNITED STATES PATENTS

| | | | |
|---|---|---|---|
| 3,233,394 | 2/1966 | Lundell | 56—24X |
| 3,393,462 | 7/1968 | Picker | 37—12 |
| 3,140,768 | 7/1964 | Marr | 198—7 |

FOREIGN PATENTS

| | | | |
|---|---|---|---|
| 43,885 | 1/1961 | Poland | 56—24 |
| 270,821 | 7/1964 | Netherlands | 56—24 |

EDWARD A. SROKA, Primary Examiner

U.S. Cl. X.R.

198—104, 128